United States Patent
Natapov et al.

(10) Patent No.: US 8,935,693 B2
(45) Date of Patent: Jan. 13, 2015

(54) HOST-TO-GUEST CHANNEL FOR GUEST DEVICE IDENTIFICATION

(75) Inventors: Gleb Natapov, Raanana (IL); Michael S. Tsirkin, Yokneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 659 days.

(21) Appl. No.: 13/118,878

(22) Filed: May 31, 2011

(65) Prior Publication Data
US 2012/0311565 A1    Dec. 6, 2012

(51) Int. Cl.
*G06F 9/455*    (2006.01)
(52) U.S. Cl.
CPC .. *G06F 9/45558* (2013.01); *G06F 2009/45579* (2013.01)
USPC .................................................. 718/1; 711/6
(58) Field of Classification Search
None
See application file for complete search history.

(56) References Cited

U.S. PATENT DOCUMENTS

| | | | |
|---|---|---|---|
| 2005/0132365 A1* | 6/2005 | Madukkarumukumana et al. | 718/1 |
| 2009/0249331 A1* | 10/2009 | Davis et al. | 718/1 |
| 2012/0072906 A1* | 3/2012 | Tsirkin et al. | 718/1 |
| 2012/0192177 A1* | 7/2012 | Tsirkin | 718/1 |

\* cited by examiner

*Primary Examiner* — Kenneth Tang
(74) *Attorney, Agent, or Firm* — Lowenstein Sandler LLP

(57) ABSTRACT

A method and system for providing a descriptive name of a device in a virtual machine system. A computer system hosts a hypervisor, a management component and a guest. The hypervisor receives from the management component a descriptive name of a device available to the guest. The descriptive name defines at least one of the functionality of the device, the content of the device, or a user of the device. The hypervisor then passes the descriptive name to the guest via a host-to-guest channel, which is a shared storage location writable by the hypervisor and readable by the guest.

18 Claims, 4 Drawing Sheets

HOST-TO-GUEST CHANNEL FOR GUEST DEVICE IDENTIFICATION

TECHNICAL FIELD

Embodiments of the present invention relate to device management in a virtual machine system, and more specifically, to the assignment of descriptive guest device identification to a guest device in a virtual machine system.

BACKGROUND

Virtualization allows the multiplexing of an underlying host computer between different virtual machines. The host computer allocates a certain amount of its resources to each of the virtual machines. Each virtual machine is then able to use the allocated resources to execute applications (referred to as a guest), including an operating system (referred to as a guest operating system) that runs on the virtual machine.

A virtual machine system can host multiple guests and each guest is assigned multiple devices, such as network interface cards (NICs), disks, graphics cards, sound cards, video cards, modems, and bridges. Typically, the host computer and the guest refer to a device by a hardware identifier (ID). A hardware ID can be a Media Access Control (MAC) address, a topological location (e.g., a Peripheral Component Interconnect (PCI) device's location on a PCI bus), a serial number, or a Universal Unique Identifier (UUID). However, there is no uniform, well-defined standard for naming a device in a virtual machine system.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for providing a descriptive name of a device in a virtual machine system. In one embodiment, a computer system hosts a hypervisor, a management component and a guest. The hypervisor receives from the management component a descriptive name of a device available to the guest. The descriptive name contains information about the functionality of the device, the content of the device, or a user of the device. The hypervisor then passes the descriptive name to the guest via a host-to-guest channel, which is a shared storage location writable by the hypervisor and readable by the guest.

Throughout the following description, the term "guest" refers to the software that runs, or can run on a hypervisor. A guest can be installed on a disk, loaded into memory, or currently running. A guest can include one or more of the following: a firmware copy in memory, an operating system, additional installed software, a browser, applications running on the browser, and other similar software. The term "virtual machine" (VM) refers to part of a hypervisor and the host computer system running the hypervisor that are visible to the guest. A virtual machine can include one or more of the following: memory, virtual central processing unit (CPU), virtual devices (e.g., emulated network interface card (NIC), disk or similar components), physical devices over which a guest is given partial or full control. The virtual machine can also emulate firmware such as Basic Input/Output System (BIOS), Extensible Firmware Interface (EFI), Advanced Configuration and Power Interface (ACPI), and similar firmware.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
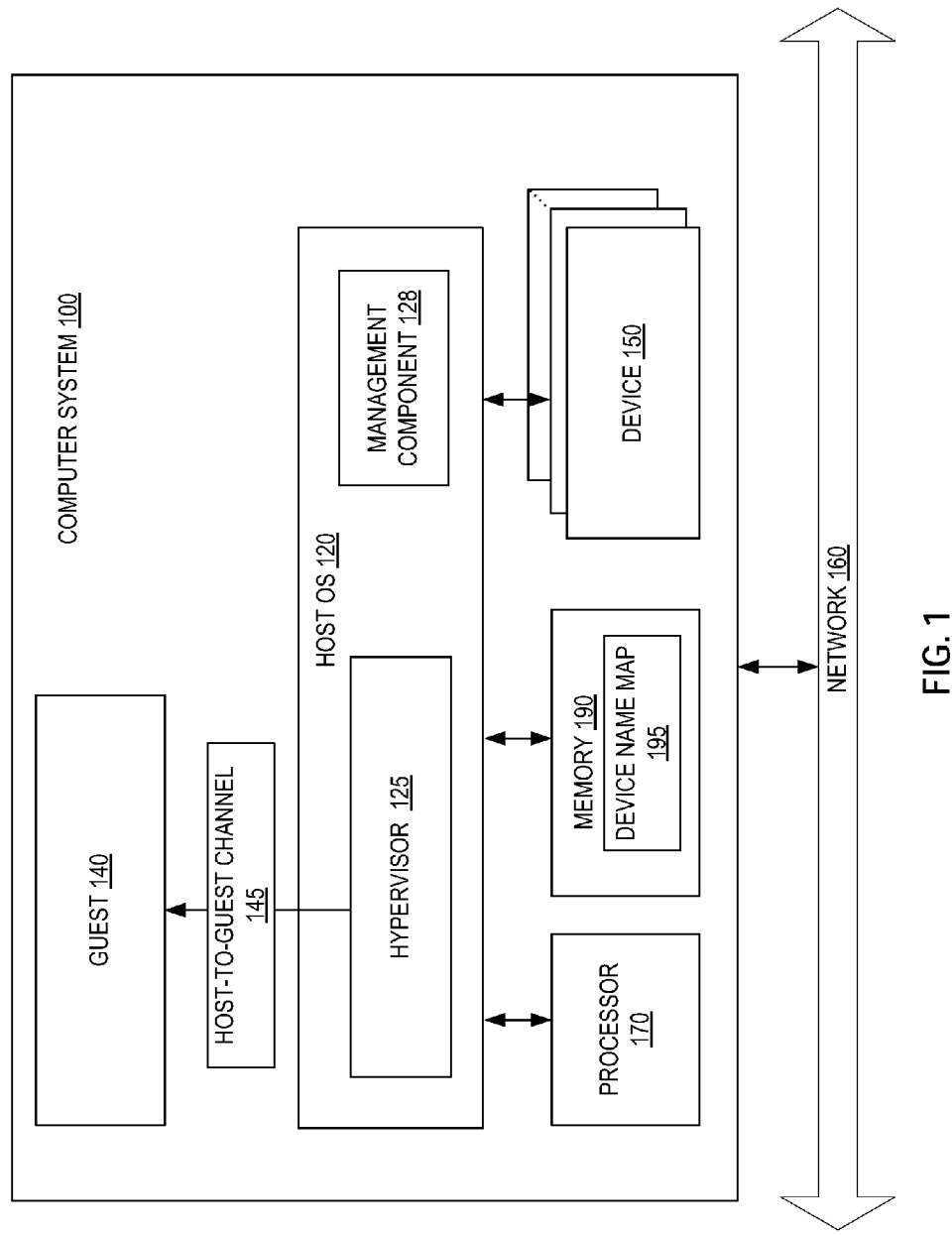
FIG. 1 is a block diagram illustrating one embodiment of a virtual machine system.

FIG. 1 is a block diagram that illustrates an embodiment of a computer system 100. The computer system 100 hosts a plurality of guests (e.g., guest 140), each of which runs a guest operating system to manage its resources. The guests may run the same or different guest operating systems, such as Microsoft Windows®, Linux®, Solaris®, Mac® OS, and other similar operating systems. The computer system 100 can be a server computer or a number of server computers (e.g, a distributed system).

In one embodiment, the computer system 100 runs a hypervisor 125 to virtualize access to the underlying host hardware (e.g., one or more processor 170 and memory 190, and other hardware components) for the guest 140 and the user of the guest 140. The hypervisor 125 is also known as a virtual machine monitor (VMM), a kernel-based hypervisor, or a host operating system 120. The hypervisor 125 presents to the guest 140 emulated hardware and software components, such that the specifics of host (i.e., the computer system 100) is hidden from the guest 140 and its user. Operations of the hypervisor 120 are executed by the one or more processors 170 of the computer system 100. Although one processor is shown in FIG. 1, it is understood that the computer system 100 can include any number of processors.

In one embodiment, the computer system 100 is accessible by remote systems via a network 160. The network 160 may be a private network (e.g., a local area network (LAN), a wide area network (WAN), intranet, or other similar private networks) or a public network (e.g., the Internet).

In one embodiment, the computer system 100 also includes one or more devices 150 accessible by the guest 140. Examples of the devices 150 include network interface cards (NICs), disks, graphics cards, sound cards, video cards, modems, bridges, and other similar components. In a virtual machine system, a device (such as the device 150) can be backed by hardware and presented to the guest 140 by the hypervisor 125 through emulation. Additionally or alternatively, the device 150 can be a software device emulated by the hypervisor 125.

In one embodiment, the association between the devices 150 and the guest 140 is managed by a management component 128. The management component 128 can be located on the same server computer as the hypervisor 125, or on a different server computer that is communicatively coupled to the hypervisor 125. In one embodiment, the management component 128 can be part of the host OS 120 or part of the hypervisor 125. For example, when a new virtual machine starts up, the guest 140 that runs on the new virtual machine will receive, from the management component 128, the identifiers of the devices 150 available to the guest 140 for access. When a new device is made available to the guest 140, the guest 140 will also receive the identifier of the new device from the management component 128.

According to one embodiment, the identifiers of the devices 150 are descriptive names of the devices 150. A descriptive name uniquely identifies a device among the devices available to the guest 140. A descriptive name contains information about the content of the device 150, the function of the device 150, and/or a user of the guest 140 to which the device 150 is available. For example, a disk allocated to a guest user Alice can be named as my_document or Alice_disk. A NIC assigned to a guest user Ben can be named as Ben_NIC. The descriptive name is more user-friendly compared to a hardware identifier, which can be a long series of digits or a topological location in a network. The descriptive name can be presented to the user (e.g., an administrator) of the management component 128 and the user (e.g., an administrator) of the guest 140 via respective user interfaces, such that both users can monitor and manage the device using a common name that conveys what the device 150 does, what the device 150 contains and/or by whom the device 150 is used. In one embodiment, the descriptive name is assigned by the user (e.g., an administrator) of the management component 128. If the user does not assign a descriptive name, the management component 128 can generate a descriptive name based on predetermined rules. The predetermined rules specify which one or more of the functionality of the device, the content of the device and the user of the device is to be included in the descriptive name. For example, the rules can include: UserName_DeviceFunction (e.g., John_NIC, Ben_Bridge), UserName_DeviceContents (e.g., Sophia_Image-File), DeviceFunction_DeviceContents (e.g., DiskStorage_Video=), or a combination of the above. In one embodiment, the descriptive names are stored in device name map 195 in the memory 190.

In one embodiment, the descriptive name is supplied to the guest 140 by the hypervisor 125 via a host-to-guest channel 145. In one embodiment, the host-to-guest channel 145 is a shared storage location (e.g., a memory location or a register location) writable by the hypervisor 125 and readable by the guest 140. In one embodiment, the host-to-guest channel 145 is separate from the device and is independent of the communication protocol used by the device.

Figure 2:
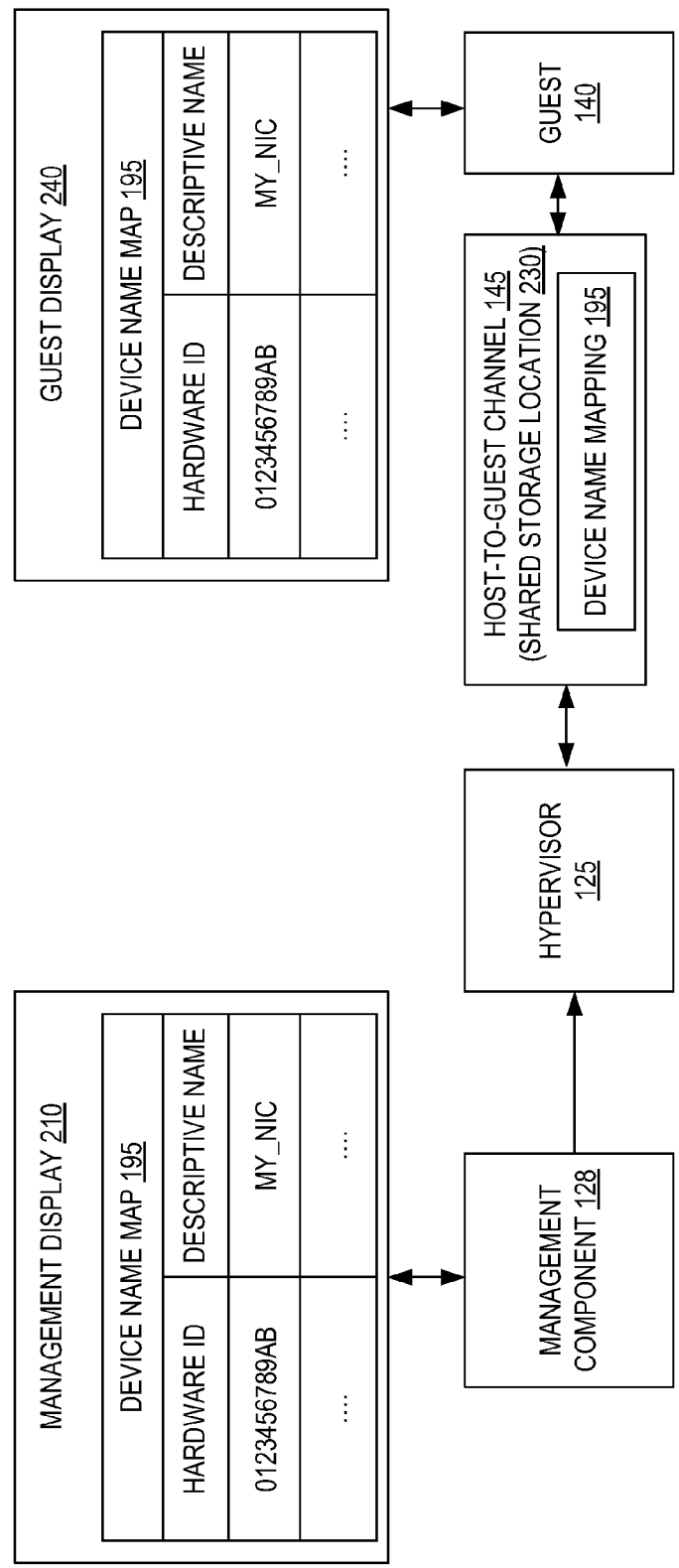
FIG. 2 is a block diagram illustrating one embodiment of a hypervisor that passes a descriptive name to a guest via a host-to-guest channel.

FIG. 2 is a block diagram that illustrates an embodiment in which the descriptive name of the device 150 is generated and passed to the guest 140. In one embodiment, the management component 128 assigns a descriptive name to the device 150. This can occur when the management component 128 starts a new virtual machine or when a new device is added to an existing guest. The descriptive name can be assigned by a user of the management component 128 via a user interface such as a graphical user interface (GUI) or a browser window on a management display 210 coupled to the management component 128. Using the management display 210, the user of the management component 128 can view, create and modify the device name map 195 that includes a one-to-one mapping between a hardware identifier of each device 150 and its corresponding descriptive name. The device name map 195 is stored in a memory location accessible to the management component 128. The management component 128 passes the device name map 195, or an update to the device name map 250, to the hypervisor 125, indicating that the device name map 195 is associated with a given guest 140. In one embodiment, the management component 128 sends a pointer to the hypervisor 125 that points to a memory location where the device name map 195 (or the update thereof) is stored. The hypervisor 125 retrieves the device name map 195 and, in turn, passes the device name map 195 to the guest 140 via the host-to-guest channel 145.

In one embodiment, the host-to-guest channel 145 between the guest 140 and the hypervisor 125 is implemented by a shared storage location 230 (e.g., a shared memory location or registers). The hypervisor 125 can place the device name map 195 or an update to a descriptive name in the shared storage location 230 upon receiving the device name map 195 or the update from the management component 128, without a request from guest. Alternatively or additionally, the guest can request the hypervisor 125 for the descriptive name of a specific device (identified by a hardware identifier in the request), and the hypervisor 125 can trap this request and provide the descriptive name to the guest.

After the guest 140 receives the mapping, it stores device name map 195 in a guest memory allocated to the guest 140. The user of the guest can then refer to the device 150 by its descriptive name and the guest can communicate with the management component 128 regarding the device 150 using the descriptive name. For example, a guest can identify some problems with the device 150 and report to the administrator of the management component 128, using the descriptive name of the device 150. Furthermore, the user of the guest 140 can view the device name map on a guest display 240 coupled to the guest 140.

Figure 3:
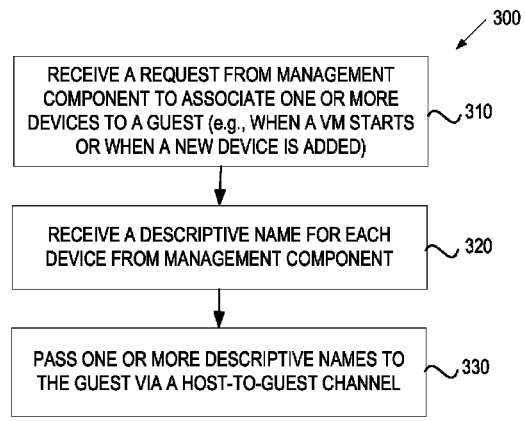
FIG. 3 is a flow diagram of one embodiment of a method for a hypervisor to pass a descriptive name to a guest via a host-to-guest channel.

FIG. 3 is a flow diagram illustrating one embodiment of a method 300 for assigning a descriptive name to a device and passing the descriptive name to a guest. The method 300 may be performed by a computer system 500 of FIG. 5 that may comprise hardware (e.g., circuitry, dedicated logic, programmable logic, microcode, or other similar hardware), software (e.g., instructions run on a processing device), or a combination thereof. In one embodiment, the method 300 is performed by the hypervisor 125 of FIG. 1 and FIG. 2.

Referring to FIG. 3, in one embodiment, the method 300 begins when the hypervisor 125, in response to a request from the management component 128, associates one or more devices 150 to the guest 140 such that the devices 150 are available to the guest 140 (block 310). The request can be sent when provisioning a new VM, or when there is a need to add a new device to the guest 140. The hypervisor 125 receives a descriptive name of each device 150 from the management component 128 (block 320). The hypervisor 125 can receive the entire device name map 195 for the devices 150 available to the guest 140, or an update to the device name map 195. The hypervisor 125 passes the one or more descriptive names (or the update thereof) to the guest 140 via a host-to-guest channel 145 (block 330), which is the shared storage location 230 writable by the hypervisor 125 and readable by the guest 140. At this point, both of the guest 140 and the management component 128 can refer to the device 150 using its descriptive name.

Figure 4:
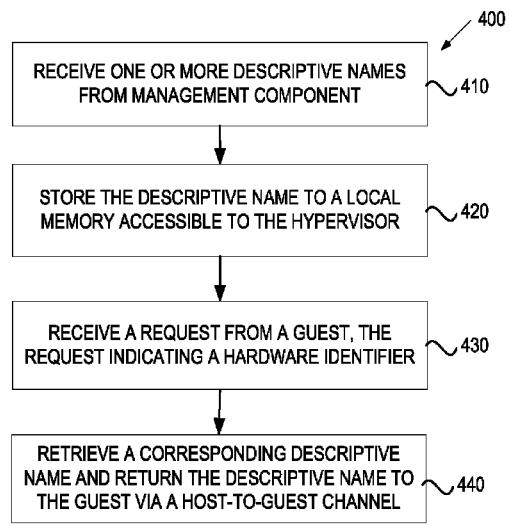
FIG. 4 is a flow diagram of another embodiment of a method for a hypervisor to pass a descriptive name to a guest via a host-to-guest channel.

FIG. 4 is a flow diagram illustrating an alternative embodiment of a method 400 for a hypervisor to pass a descriptive name to a guest. The method 400 may be performed by a computer system 500 of FIG. 5 that may comprise hardware (e.g., circuitry, dedicated logic, programmable logic, microcode, or other similar hardware), software (e.g., instructions run on a processing device), or a combination thereof. In one embodiment, the method 400 is performed by the hypervisor 125 of FIG. 1 and FIG. 2.

Referring to FIG. 4, in one embodiment, the method 400 begins when the hypervisor 125 receives one or more descriptive names from the management component 128 (block 410). The hypervisor 125 can receive the entire device name map 195 for the devices 150 available to the guest 140, or an update to the device name map 195. The hypervisor 125 stores the received descriptive name(s) in a local memory accessible by the hypervisor 125 (block 420). Upon receiving a request from the guest 140 that indicates a hardware identifier (block 430), the hypervisor 125 retrieves the descriptive name corresponding to the hardware identifier from the local memory and returns the retrieved descriptive name to the guest 140 via the host-to-guest channel 145 (block 440).

Figure 5:
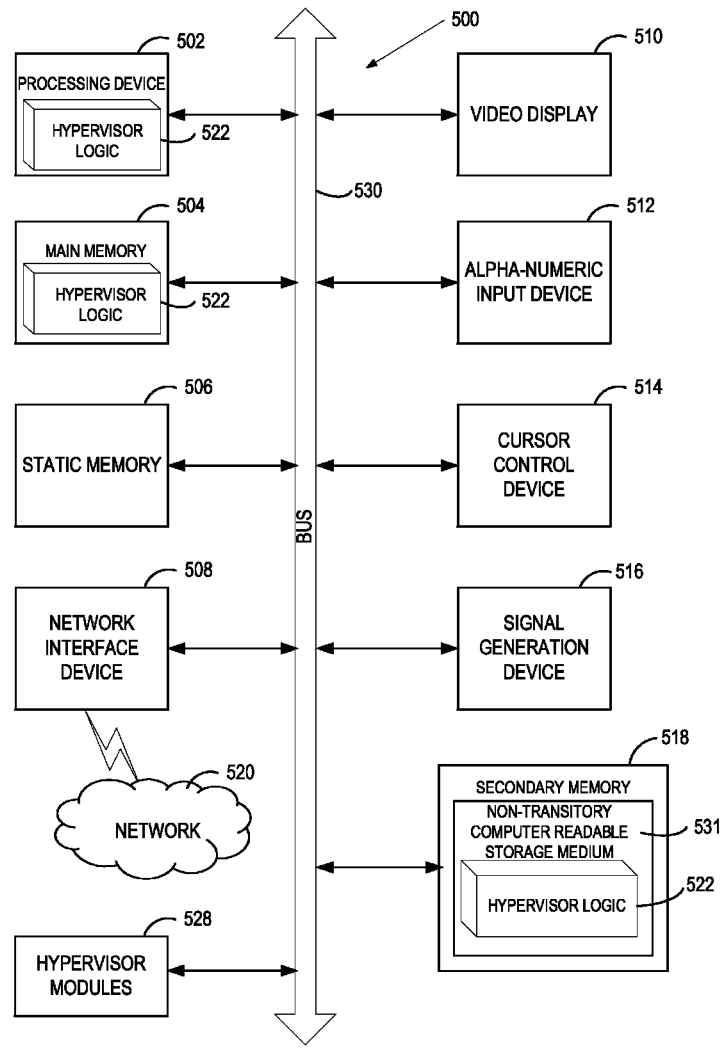
FIG. 5 illustrates a diagrammatic representation of a machine in the exemplary form of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM), Rambus DRAM (RDRAM), or other variations of memory), a static memory 506 (e.g., flash memory, static random access memory (SRAM), or other variations of static memory), and a secondary memory 518 (e.g., a data storage device), which communicate with each other via a bus 530.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute hypervisor logic 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a non-transitory computer readable storage medium) 531 on which is stored one or more sets of instructions (e.g., hypervisor logic 522) embodying any one or more of the methodologies or functions described herein (e.g., the hypervisor 125 of FIGS. 1 and 2). The hypervisor logic 522 may also reside, completely or at least partially, within the main memory 504 and/or within the processing device 502 during execution thereof by the computer system 500; the main memory 504 and the processing device 502 also constituting machine-readable storage media. The hypervisor logic 522 may further be transmitted or received over a network 520 via the network interface device 508.

The non-transitory computer readable storage medium 531 may also be used to store the hypervisor logic 522 persistently. While the non-transitory computer storage medium 531 is shown in an exemplary embodiment to be a single medium, the term "non-transitory computer storage medium" should be taken to include a single medium or multiple media (e.g., a centralized or distributed database, and/or associated caches and servers) that store the one or more sets of instructions. The term "non-transitory computer storage medium" shall also be taken to include any medium that is capable of storing or encoding a set of instructions for execution by the machine that causes the machine to perform any one or more of the methodologies of the present invention. The term "non-transitory computer storage medium" shall accordingly be taken to include, but not be limited to, solid-state memories, and optical and magnetic media.

The computer system 500 may additionally include hypervisor modules 528 for implementing the functionalities of the hypervisor 125 of FIGS. 1 and 2. The module 528, components and other features described herein (for example in relation to FIG. 1) can be implemented as discrete hardware components or integrated in the functionality of hardware components such as ASICS, FPGAs, DSPs or similar devices. In addition, the module 528 can be implemented as firmware or functional circuitry within hardware devices. Further, the module 528 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "passing," "returning," "identifying," "reporting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a non-transitory computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, implemented by a computer system, comprising:
    identifying, by a hypervisor of the computer system, a descriptive name of a device available to a guest hosted by the computer system, the descriptive name being automatically determined by a management component of the computer system using one or more rules specifying that the descriptive name is to include at least one of functionality of the device, content of the device, or a user of the device; and
    passing, by a processing device executing the hypervisor, the descriptive name to the guest via a host-to-guest channel, the host-to-guest channel being a shared storage location writable by the hypervisor and readable by the guest.

2. The method of claim 1, further comprising:
    passing, by the hypervisor, a device name map to the guest when the guest is booted, wherein the device name map comprises a one-to-one mapping between the descriptive name of each of a set of devices available to the guest and a corresponding hardware identifier for the device in the set of the devices.

3. The method of claim 1, further comprising:
    receiving, by the hypervisor, a request from the guest, the request indicating a requested hardware identifier; and
    returning, by the hypervisor, a corresponding descriptive name for the requested hardware identifier to the guest.

4. The method of claim 1, wherein the host-to-guest channel is separate from the device and independent of a communication protocol used by the device.

5. The method of claim 1, further comprising:
    identifying, by the guest, a problem with the device; and
    reporting, by the guest, the problem to the management component using the descriptive name.

6. The method of claim 1, wherein the descriptive name is assigned using input of a user of the management component.

7. A system comprising:
    a memory to store a descriptive name of a device available to a guest hosted by a computer system and managed by a hypervisor of the computer system;
    a host-to-guest channel to provide a shared storage location writable by the hypervisor and readable by the guest; and
    a processor, coupled to the memory, to receive the descriptive name of the device from a management component, and pass the descriptive name to the guest via the host-to-guest channel, wherein the descriptive name is automatically determined by the management component using one or more rules specifying that the descriptive name is to include at least one of functionality of the device, content of the device, or a user of the device.

8. The system of claim 7, further comprising:
    a display to display the descriptive name to a user of the guest.

9. The system of claim 7, further comprising:
    a display to display the descriptive name to a user of the management component.

10. The system of claim 7, wherein the memory stores a device name map, which is passed from the hypervisor to the guest when the guest is booted, wherein the device name map comprises a one-to-one mapping between the descriptive name of each of a set of devices available to the guest and a corresponding hardware identifier for the device in the set of the devices.

11. The system of claim 7, wherein the hypervisor is operative to receive a request from the guest that indicates a requested hardware identifier, and return a corresponding descriptive name for the requested hardware identifier to the guest.

12. The system of claim 7, wherein the host-to-guest channel is separate from the device and independent of a communication protocol used by the device.

13. A non-transitory computer readable storage medium having stored therein instructions that, when executed by a processing device cause the processing device to perform operations comprising:
    receiving, by a hypervisor of the computer system, a descriptive name of a device from a management component of the computer system, the device being available to a guest hosted by the computer system, the descriptive name being automatically determined by the management component using one or more rules specifying that the descriptive name is to include at least one of functionality of the device, content of the device or a user of the device; and
    passing, by the processing device executing the hypervisor, the descriptive name to the guest via a host-to-guest channel, the host-to-guest channel being a shared storage location writable by the hypervisor and readable by the guest.

14. The computer readable storage medium of claim 13, further comprising:

passing, by the hypervisor, a device name map to the guest when the guest is booted, wherein the device name map comprises a one-to-one mapping between the descriptive name of each of a set of devices available to the guest and a corresponding hardware identifier for the device in the set of the devices.

15. The computer readable storage medium of claim 13, further comprising:
receiving, by the hypervisor, a request from the guest, the request indicating a requested hardware identifier; and
returning, by the hypervisor, a corresponding descriptive name for the requested hardware identifier to the guest.

16. The computer readable storage medium of claim 13, wherein the host-to-guest channel is separate from the device and independent of a communication protocol used by the device.

17. The computer readable storage medium of claim 13, further comprising:
identifying, by the guest, a problem with the device; and
reporting, by the guest, the problem to the management component using the descriptive name.

18. The computer readable storage medium of claim 13, wherein the descriptive name is assigned using input of a user of the management component.

\* \* \* \* \*